US 6,475,540 B1

(12) United States Patent
Howling et al.

(10) Patent No.: US 6,475,540 B1
(45) Date of Patent: Nov. 5, 2002

(54) RTE CEREALS AND OTHER FOODS PRESWEETENED WITH D TAGATOSE

(75) Inventors: David Howling, Manchester (GB); John L. Callagan, Manchester (GB)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 09/483,132

(22) Filed: Jan. 14, 2000

Related U.S. Application Data

(60) Provisional application No. 60/116,449, filed on Jan. 19, 1999.

(51) Int. Cl.[7] .................................................. A23G 3/00
(52) U.S. Cl. ......................... 426/94; 426/103; 426/548; 426/549; 426/619; 426/620
(58) Field of Search ......................... 426/94, 103, 548, 426/658, 89, 549, 559, 560, 618, 619, 620, 621

(56) References Cited

U.S. PATENT DOCUMENTS

| 4,389,420 A | * | 6/1983 | Yong et al. ................... 426/94 |
|---|---|---|---|
| 4,455,233 A | | 6/1984 | Hong et al. .................... 426/94 |
| 4,786,722 A | | 11/1988 | Zehner |
| 4,859,477 A | * | 8/1989 | Augustine et al. .......... 426/103 |
| 5,356,879 A | | 10/1994 | Zehner et al. |
| 5,447,917 A | | 9/1995 | Zehner et al. |
| 6,217,921 B1 | * | 4/2001 | Lanner et al. ............... 426/103 |

FOREIGN PATENT DOCUMENTS

| WO | WO 9722263 | 6/1997 |
|---|---|---|

\* cited by examiner

*Primary Examiner*—Leslie Wong
(74) *Attorney, Agent, or Firm*—Howard & Howard

(57) ABSTRACT

This invention discloses an RTE cereal having a sugar coating containing D tagatose, either alone or in combination with at least one polyol, and processes for preparing such cereal. This invention also discloses other foodstuffs, including functional and convenience foods, that are presweetened with a syrup solution containing D tagatose, either alone or in combination with at least one polyol, and processes for preparing such foodstuffs.

5 Claims, No Drawings

RTE CEREALS AND OTHER FOODS PRESWEETENED WITH D TAGATOSE

This application claims benefit of provisional application 60/116,449 filed Jan. 19, 1999.

BACKGROUND

The present invention relates to presweetened ready to eat (RTE) breakfast cereals and other foods wherein D tagatose partially or totally replaces sucrose or other commonly used sugars.

RTE cereals are a significant source of healthy nutrition. Many RTE cereals contain sugars for better palatability. Most commonly used sugars, such as sucrose, fructose, or glucose, in presweetened RTE cereals have the disadvantage of potentially causing dental carries and of precluding the diabetic segment of the population from obtaining the nutritional benefit of RTE cereals.

The present invention addresses this problem by providing RTE cereals and other foods that are presweetened with a sugar which, while having substantially the same sweetness, does not have the disadvantages of commonly used sugars discussed above.

SUMMARY

The present invention relates to presweetened RTE cereals and other foods wherein D tagatose, whether alone or in combination with one or more polyols, replaces sucrose or other commonly used sugars, and processes for preparing such cereals.

Other embodiments of the present invention are further described hereinbelow.

DESCRIPTION

The present invention replaces sugars, such as sucrose, fructose or glucose, which are commonly used to presweeten cereals and other foods, including functional and convenience foods, with a sugar having substantially the same sweetness, a pleasant flavor, none of the disadvantages of the commonly used sugars, and additional health benefits.

The sugar used in the present invention is D tagatose, which is a naturally occurring ketohexose with a melting point of 134° C. The calorific value of D tagatose is less than half of the calorific value of sucrose and it is noncariogenic. D tagatose does not cause a rise in glycaemic index and is therefore safe for consumption by diabetic consumers. D tagatose also has a prebiotic effect, causing a desirable fermentation to butyrate in the colon.

A preferred embodiment of this invention is a D tagatose coated RTE cereal to which the sweetener is applied subsequent to the main processing.

If D tagatose is used in a normal cereal cooking process that is typical of Corn Flakes or Rice Krispies, it undergoes a Maillard non enzymatic browning reaction upon heating, causing the final product to become brown and bitter. However, it has been discovered that if the D tagatose is applied as a syrup solution to flakes, rice or other preformed cereal pieces to either form a frost or glass coating, then the discoloration can be minimized, producing a final product with a desirable color and organoleptic appeal. The D tagatose containing syrup must first be heated to a temperature sufficient to dissolve the D tagatose crystals.

In producing a glazed (non-crystalized) sugar coating, a heated D tagatose containing syrup solution can be applied to the preformed cereal pieces in accordance with any of the methods known in the art.

It has been discovered that in producing a frosted (crystalized) sugar coating, application of a heated D tagatose containing syrup to preformed cereal pieces in accordance with standard methods does not lead to crystallization of D tagatose and instead results in a glazed final product. Such standard methods usually involve spraying a syrup solution onto the preformed cereal pieces, and then immediately drying the cereal pieces at temperatures in excess of 110° C.

In the present invention, it has been discovered that in order to produce a frosted product using a heated D tagatose containing syrup solution, the syrup solution must first be cooled to a temperature sufficient to cause incipient crystallization of the solution, such that the solution becomes cloudy and viscous. This temperature is usually from about 50° C. to about 70° C., depending on viscosity. After the syrup solution is cooled, it is sprayed onto the preformed cereal pieces. Spraying of the syrup onto the cereal pieces requires a balance between viscosity and crystallization. It is essential that incipient crystallization occurs before the syrup solution is sprayed onto the preformed cereal pieces. The sprayed cereal pieces are then allowed to cool for at least one hour at ambient temperature before being dried at a maximum of 80° C.

D tagatose can be added to RTE cereals of all kinds, including flakes, puffs, rice and bran shreds. Although it is preferred to add a D tagatose containing syrup to a cereal after the main processing of the cereal is complete, D tagatose may also be added during extrusion of the cereal, provided that a short time or a low temperature regime is used, or after cooking or toasting of the cereal.

A D tagatose containing syrup may also used as a sucrose free, non cariogenic, reduced calorie, insulin independent sweetening composition in a variety of other foods in addition to RTE cereals, including baked goods or functional and convenience foods such as snack bars and toaster pastries.

In a further embodiment of this invention, D tagatose may also be used in an admixture with one or more polyol(s) such as sorbitol, maltitol, isomalt, erythritol, xylitol, lactitol or hydrogenated corn syrups. A common disadvantage of polyols, with the exception of erythrotol, is a pronounced laxative effect. Some polyols, like sorbitol and maltitol, are very hygroscopic while others like iso malt and lactitol have reduced sweetness as compared to sucrose, or yet others, like xylitol and erythritol have a pronounced cooling effect which in some products is undesirable. None of the polyols can undergo Maillard browning which in certain foods like RTE cereals and baked goods is desirable to produce color and flavor.

D tagatose does not have these disadvantages and, by admixture with one or more polyol(s) leads to an improved sucrose free, non cariogenic, reduced calorie, insulin independent sweetening composition. This sweetening composition may be used as a glazed coating on RTE cereals or as a sweetener in a variety of other foods, including convenience and functional foods, gums and candies. The sweetness of the composition can be improved by the addition of intense sweeteners, sweetness potentiators such as neohesperidine di hydro chacone, or commercially available sweet flavors.

The following examples describe preferred embodiments of the invention. It will be understood that the examples provided herein are illustrative and do not limit the scope of the invention.

EXAMPLE 1

Production of non crystallized sugar coating

In this example D tagatose replaces sugar on a one for one basis in a standard formulation to provide a non crystallized coating for corn flakes. The coating also has adhesive properties to adhere nuts, fruits, etc., to the flake. The glazed corn flakes are prepared as follows:

A D tagatose solution at 72–73° Brix (as referred herein, Brix will refer to a D tagatose equivalent) is heated to 58° C.–61° C. until the D tagatose crystals are dissolved. The solution is then heated to 70° C. to give a more mobile solution and sprayed on the base flakes through an LRF 6 spray head. The glazed flakes are then dried in a commercial drier at 110° C. for three cycles of one to two minutes; one to four minutes; and one to four minutes; wherein the flakes are turned in between each drying cycle.

EXAMPLE 2

Production of a crystallized (frosted) sugar coating

Standard sucrose frosting procedures did not produce a satisfactory product when sucrose was replaced with D tagatose because D tagatose was not crystallized.

To produce an acceptable product, the following procedure was used. A D tagatose solution at 83° Brix was heated to about 97° C. until the D tagatose crystals were dissolved. The solution was then cooled to about 70° C. to the point of incipient crystallization. Then 550 g of this solution were sprayed through an LF 12 nozzle onto 750 g of corn flake cereal pieces. To avoid glazing, the sprayed flakes were allowed to cool with cold air at ambient temperature for up to two hours before being dried in small trays at a maximum of 80° C. for 15 minutes. This produced a good frosted product.

EXAMPLE 3

Production of a crystallized (frosted) sugar coating

A D tagatose solution at 83° Brix was heated to about 100° C. until the D tagatose crystals were dissolved. The solution was then cooled to about 62° C. to the point of incipient crystallization. Then 550 g of this solution were sprayed through an LF 12 nozzle onto 750 g of puff rice pieces. The flakes were then cooled with cold air to entice frosting, partially dried overnight and then dried in a commercial drier at from 92° C. to 100° C. for seven minutes. This produced a good frosted product.

EXAMPLE 4

Production of a non crystallized sugar coating with D tagatose and a polyol

Three 80° Brix syrups consisting of:

33% maltitol and 67% D tagatose

50% maltitol and 50% D tagatose

67% maltitol and 33% D tagatose were separately applied to o-shaped cereal pieces either by spraying or dipping of the cereal piece into the syrup. The syrup temperature was held at 110° C. After the application of the syrup, the pieces were dried at 110° C. for 30 minutes. Sweetener levels were produced at 30% to 50% of the total weight.

EXAMPLE 5

Three 80° Brix syrups were prepared in accordance with Example 4, but xylitol was used in place of maltitol.

It will be understood that the specification and examples are illustrative of the present invention and that other embodiments within the spirit and scope of the invention will suggest themselves to those skilled in the art. All references cited herein are incorporated by reference.

What is claimed is:

1. A ready-to-eat cereal piece having an exterior sugar coating consisting essentially of D tagatose.

2. A ready-to-eat cereal piece having an exterior sugar coating consisting essentially of D tagatose and at least one polyol.

3. A ready-to-eat cereal piece having an exterior glazed, non-crystallized coating consisting essentially of D tagatose.

4. A ready-to-eat cereal piece having a frosted, crystallized coating consisting essentially of D tagatose.

5. A ready-to-eat cereal piece having an exterior glazed, non-crystallized coating consisting essentially of D tagatose and at least one polyol.

* * * * *